United States Patent
Huang et al.

(10) Patent No.: US 11,101,738 B2
(45) Date of Patent: Aug. 24, 2021

(54) POWER CONVERTER AND CONTROL METHOD THEREOF AND POWER SUPPLY SYSTEM

(71) Applicant: Delta Electronics, Inc., Taoyuan (TW)

(72) Inventors: Junlai Huang, Taoyuan (TW); Youzhun Cai, Taoyuan (TW); Dominik Reinhard Beinlich, Taoyuan (TW); Lingfeng Jiang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/900,475

(22) Filed: Jun. 12, 2020

(65) Prior Publication Data

US 2020/0403517 A1 Dec. 24, 2020

(30) Foreign Application Priority Data

Jun. 20, 2019 (CN) .......................... 201910538305.0

(51) Int. Cl.
 *H02M 3/335* (2006.01)
(52) U.S. Cl.
 CPC ... *H02M 3/33584* (2013.01); *H02M 3/33546* (2013.01)
(58) Field of Classification Search
 None
 See application file for complete search history.

(56) References Cited

U.S. PATENT DOCUMENTS

| 6,504,497 B2 | 1/2003 | Jang et al. |
| 7,061,212 B2 | 6/2006 | Phadke |

(Continued)

FOREIGN PATENT DOCUMENTS

| CN | 101128974 A | 2/2008 |
| CN | 102088194 A | 6/2011 |

(Continued)

OTHER PUBLICATIONS

Chen Yiwen et al, Single-stage Single-phase Step-up Mode Photovoltaic Grid-connected Inverter Systems, CSEE, Sep. 5, 2017, vol. 37 No. 17, pp. 5086-5097.

(Continued)

*Primary Examiner* — Jeffrey A Gblende
*Assistant Examiner* — Henry E Lee, III
(74) *Attorney, Agent, or Firm* — Kirton McConkie; Evan R. Witt

(57) ABSTRACT

A power converter includes a PFC circuit, a first capacitor, a second capacitor and an auxiliary circuit. The PFC circuit provides a first intermediate voltage to the first capacitor. The auxiliary circuit includes a first auxiliary branch circuit and a second auxiliary branch circuit. When the first auxiliary branch circuit is enabled, and the first intermediate voltage is transmitted to the second capacitor through the first auxiliary branch circuit. When the second auxiliary branch circuit is enabled, the first intermediate voltage is boosted by the second auxiliary branch circuit, so that a second intermediate voltage is provided by the second capacitor. While an operation state of the load is switched between a light load condition and a heavy load condition, one of the first auxiliary branch circuit and the second auxiliary branch circuit is selectively enabled.

22 Claims, 6 Drawing Sheets

(56) References Cited

U.S. PATENT DOCUMENTS

| | | | |
|---|---|---|---|
| 7,173,403 B1 | 2/2007 | Chen et al. | |
| 9,479,046 B2* | 10/2016 | Lin | H02M 1/40 |
| 10,135,342 B1 | 11/2018 | Yu | |
| 10,700,589 B2* | 6/2020 | Perreault | H02M 3/1582 |
| 2002/0071300 A1 | 6/2002 | Jang et al. | |
| 2003/0202368 A1* | 10/2003 | Ierymenko | H02M 1/4208 |
| | | | 363/125 |
| 2004/0264219 A1 | 12/2004 | Zhang | |
| 2014/0109553 A1 | 4/2014 | Roberts, Jr. et al. | |
| 2017/0133857 A1 | 5/2017 | Sun et al. | |
| 2018/0356876 A1* | 12/2018 | Gharpure | H02M 7/06 |

FOREIGN PATENT DOCUMENTS

| | | |
|---|---|---|
| CN | 202364144 U | 8/2012 |
| CN | 104184348 A | 12/2014 |
| CN | 104335680 A | 2/2015 |
| CN | 205882709 U | 1/2017 |
| CN | 106685201 | 5/2017 |
| CN | 107040149 A | 8/2017 |
| CN | 109155584 A | 1/2019 |
| CN | 109660139 A | 4/2019 |
| JP | 2011125075 A | 6/2011 |
| JP | 2016208558 A | 12/2016 |
| TW | 200620804 A | 6/2006 |
| TW | 200917015 A | 4/2009 |
| WO | 2018146902 A1 | 8/2018 |

OTHER PUBLICATIONS

Xianqing, Shen et al., Principle and Design of Switching Power Supply, Dec. 2012.

\* cited by examiner

POWER CONVERTER AND CONTROL METHOD THEREOF AND POWER SUPPLY SYSTEM

CROSS-REFERENCE TO RELATED APPLICATION

This application claims priority to China Patent Application No. 201910538305.0, filed on Jun. 20, 2019, the entire contents of which are incorporated herein by reference for all purposes.

FIELD OF THE INVENTION

The invention relates to a power converter and a power supply system, in particular, a power converter and a power supply system for powering a large dynamic load and increasing the power density. The invention also relates to a control method of the power converter.

BACKGROUND OF THE INVENTION

Nowadays, servers are widely used for Artificial Intelligent Computing. As the amount of the data to be processed by the server and the computing speed of the server are gradually increased, the power converter needs to be improved. For example, the power converter needs to have the higher dynamic change rate and the higher peak power.

The conventional power converter comprises a power factor correction (PFC) circuit and a DC-DC circuit. The PFC circuit receives an input voltage and rectifies the input voltage into a DC intermediate bus voltage. The DC-DC circuit receives the DC intermediate bus voltage and converts to an output voltage. The conventional power converter cannot respond to the large dynamic change rate rapidly. For example, when the load is changed from a light load condition to a heavy load condition, DC intermediate bus voltage is largely decreased because the dynamic response speed of the PFC circuit is slow. Since the voltage received by the DC-DC circuit is decreased, and in case that the DC-DC circuit is an LLC resonant circuit, the resonant capacitor voltage and the resonant current are largely increased. So the electronic components (for example inductor and capacitor) of the DC-DC circuit have to withstand high voltage and high current. Moreover, due to the limitations of maximum gain of the DC-DC circuit topology, the large decrease of the input voltage of the DC-DC circuit may lead in voltage drop of the output voltage.

Therefore, there is a need to provide an improved power converter, a control method and a power supply system to overcome the drawbacks of the conventional technologies.

SUMMARY OF THE INVENTION

Embodiments of an aspect of the invention provide a power converter, a control method and a power supply system to improve load response capability with enhanced power density.

In accordance with an aspect of the invention, a power converter is provided. The power converter is configured to convert an input voltage into an output voltage, and provide the output voltage to a large dynamic load. The power converter comprises a PFC circuit, a first capacitor, a second capacitor, an auxiliary circuit, a DC-DC circuit and a control circuit. The PFC circuit is configured to convert the input voltage into a first intermediate voltage. The first capacitor is electrically connected with the PFC circuit. An input terminal of the auxiliary circuit is electrically connected with the first capacitor and the PFC circuit. An output terminal of the auxiliary circuit is electrically connected with the second capacitor. The auxiliary circuit converts the first intermediate voltage into a second intermediate voltage on the second capacitor. The auxiliary circuit includes a first auxiliary branch circuit and a second auxiliary branch circuit. The second auxiliary branch circuit is connected with the first auxiliary branch circuit in parallel. When the second auxiliary branch circuit is disabled, the first auxiliary branch circuit is enabled. When the second auxiliary branch circuit is enabled, the first auxiliary branch circuit is disabled. The DC-DC circuit is electrically connected with the second capacitor and the output terminal of auxiliary circuit, and converts the second intermediate voltage into the output voltage. The control circuit is electrically connected with the PFC circuit, the auxiliary circuit and the DC-DC circuit. While an operation state of the load is switched between a light load condition and a heavy load condition, one of the first auxiliary branch circuit and the second auxiliary branch circuit is enabled by the control circuit according to a result of comparing the first intermediate voltage with a first threshold voltage and a second threshold voltage and a result of comparing the second intermediate voltage with the first threshold voltage and the second threshold voltage.

In accordance with another aspect of the invention, a power supply system is provided. The power supply system includes plural power converters. The output terminals of the plural power converters are connected with each other in parallel. Each power converter converts an input voltage into an output voltage and provides the output voltage to a large dynamic load. Each power converter includes a PFC circuit, a first capacitor, a second capacitor, an auxiliary circuit, a DC-DC circuit and a control circuit. The PFC circuit is configured to convert the input voltage into a first intermediate voltage. The first capacitor is electrically connected with the PFC circuit. An input terminal of the auxiliary circuit is electrically connected with the first capacitor and the PFC circuit. An output terminal of the auxiliary circuit is electrically connected with the second capacitor. The auxiliary circuit converts the first intermediate voltage into a second intermediate voltage on the second capacitor. The auxiliary circuit includes a first auxiliary branch circuit and a second auxiliary branch circuit. The first auxiliary branch circuit and the second auxiliary branch circuit are connected with each other in parallel. When the second auxiliary branch circuit is disabled, the first auxiliary branch circuit is enabled. When the second auxiliary branch circuit is enabled, the first auxiliary branch circuit is disabled. The DC-DC circuit is electrically connected with the second capacitor and the output terminal of the auxiliary circuit, and converts the second intermediate voltage into the output voltage. The control circuit is electrically connected with the PFC circuit, the auxiliary circuit and the DC-DC circuit. While an operation state of the load is switched between a light load condition and a heavy load condition, one of the first auxiliary branch circuit and the second auxiliary branch circuit is enabled by the control circuit according to a result of comparing the first intermediate voltage with a first threshold voltage and a second threshold voltage and a result of comparing the second intermediate voltage with the first threshold voltage and the second threshold voltage.

In accordance with a further aspect of the invention, a control method of a power converter is provided. The power converter is configured to provide an output voltage to a large dynamic load. The power converter comprises a PFC circuit, a first capacitor, a second capacitor, an auxiliary circuit, a DC-DC circuit. The PFC circuit is configured to convert an input voltage into a first intermediate voltage. The first capacitor is electrically connected with the PFC circuit. An input terminal of the auxiliary circuit is electrically connected with the first capacitor and the PFC circuit. An output terminal of the auxiliary circuit is electrically connected with the second capacitor. The auxiliary circuit converts the first intermediate voltage into a second intermediate voltage on the second capacitor. The auxiliary circuit comprises a first auxiliary branch circuit and a second auxiliary branch circuit. The second auxiliary branch circuit is connected with the first auxiliary branch circuit in parallel. When the second auxiliary branch circuit is disabled, the first auxiliary branch circuit is enabled. When the second auxiliary branch circuit is enabled, the first auxiliary branch circuit is disabled. The DC-DC circuit is electrically connected with the second capacitor and the auxiliary circuit, and converts the second intermediate voltage into the output voltage. The control method comprises: detecting the first intermediate voltage and the second intermediate voltage; controlling the operation of the auxiliary circuit according to the first intermediate voltage and the second intermediate voltage; wherein an operation state of the load is switched between a light load condition and a heavy load condition, the operation of the auxiliary circuit is controlled according to a result of comparing the first intermediate voltage with a first threshold voltage and a second threshold voltage and a result of comparing the second intermediate voltage with the first threshold voltage and the second threshold voltage.

The above contents of the invention will become more readily apparent to those ordinarily skilled in the art after reviewing the following detailed description and accompanying drawings.

DETAILED DESCRIPTION OF THE PREFERRED EMBODIMENT

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
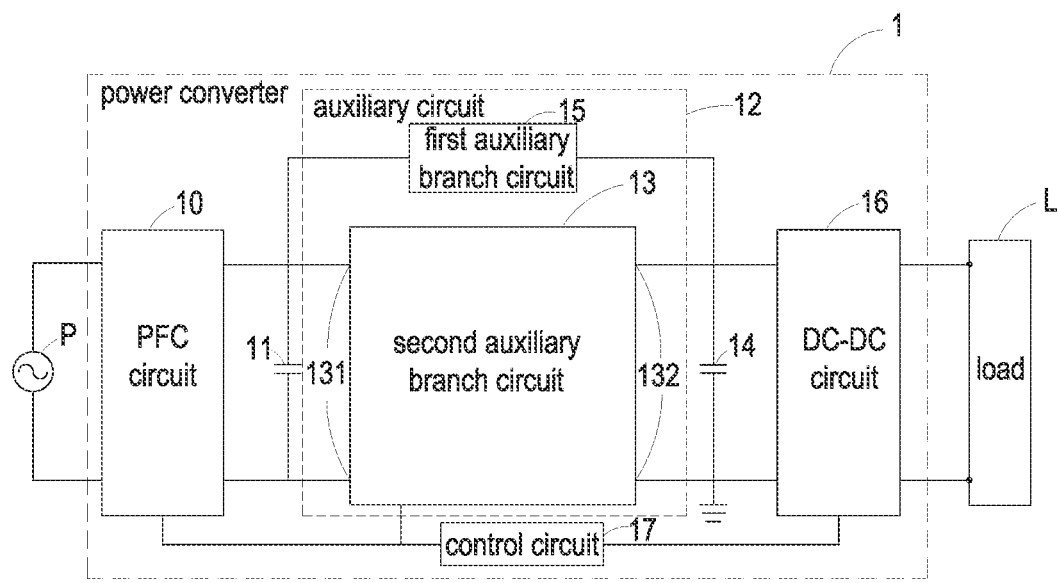
FIG. 1 is a schematic circuit diagram illustrating a power converter according to an embodiment of the invention.

FIG. 1 is a schematic circuit diagram illustrating a power converter according to an embodiment of the invention. As shown in FIG. 1, the power converter 1 is electrically connected between an input power source P and at least one load L. The power converter 1 comprises a PFC circuit 10, a first capacitor 11, an auxiliary circuit 12, a second capacitor 14, a DC-DC circuit 16 and a control circuit 17.

An example of the PFC circuit 10 is but not limited to a power factor correction (PFC) circuit. The PFC circuit 10 is electrically connected with the input power source P and the first capacitor 11. The PFC circuit 10 receives an input voltage from the input power source P and converts the input voltage into a first intermediate voltage. The first capacitor 11 is charged by the first intermediate voltage, and the PFC circuit 10 provides the first intermediate voltage through the first capacitor 11.

The auxiliary circuit 12 is electrically connected between the first capacitor 11 and the second capacitor 14. And the auxiliary circuit 12 is electrically connected between the PFC circuit 10 and the DC-DC circuit 16. The auxiliary circuit 12 includes a first auxiliary branch circuit 15 and a second auxiliary branch circuit 13. The first auxiliary branch circuit 15 and the second auxiliary branch circuit 13 are connected with each other in parallel. A first terminal of the first auxiliary branch circuit 15 is electrically connected with a first terminal of the first capacitor 11. A second terminal of the first auxiliary branch circuit 15 is electrically connected with a first terminal of the second capacitor 14. The second auxiliary branch circuit 13 is electrically connected between the first capacitor 11 and the second capacitor 14. An input terminal 131 of the second auxiliary branch circuit 13 is electrically connected with the PFC circuit 10 and the first capacitor 11. An output terminal 132 of the second auxiliary branch circuit 13 is electrically connected with the second capacitor 14. The second auxiliary branch circuit 13 receives the first intermediate voltage from the first capacitor 11. When the second auxiliary branch circuit 13 is enabled, the first auxiliary branch circuit 15 is disabled, and the first intermediate voltage is boosted by the second auxiliary branch circuit 13. The second capacitor 14 is charged by the second intermediate voltage. Consequently, auxiliary circuit 12 provides a second intermediate voltage through the second capacitor 14.

Moreover, when the second auxiliary branch circuit 13 is disabled, the first auxiliary branch circuit 15 is enabled to bypass the second auxiliary branch circuit 13. The first intermediate voltage from the PFC circuit 10 is transmitted to the second capacitor 14 through the first auxiliary branch circuit 15. And the second intermediate voltage is provided by the second capacitor 14.

An example of the DC-DC circuit 16 is but not limited to a LLC circuit. The input terminal of the DC-DC circuit 16 is electrically connected with the second auxiliary branch circuit 13, the second capacitor 14 and the first auxiliary branch circuit 15. The output terminal of the DC-DC circuit 16 is electrically connected with the load L. The DC-DC circuit 16 receives the second intermediate voltage from the second capacitor 14 and converts the second intermediate voltage into an output voltage. The output voltage is transmitted to the at least one load L. In an embodiment, the load L is a large dynamic load. For example, the load L is a graphics processing unit (GPU).

The control circuit 17 is electrically connected with the PFC circuit 10, the first capacitor 11, the second capacitor 14, the auxiliary circuit 12 and the DC-DC circuit 16. The control circuit 17 detects the first intermediate voltage from the first capacitor 11 and the second intermediate voltage from the second capacitor 14. Moreover, the control circuit 17 controls the operations of the second auxiliary branch circuit 13 and the first auxiliary branch circuit 15 according to the detecting result. When the power converter 1 is in the normal working state (e.g., the load L is in a light load condition), the second auxiliary branch circuit 13 is disabled and the first auxiliary branch circuit 15 is enabled to bypass the second auxiliary branch circuit 13 by the control circuit 17. Under this circumstance, the first intermediate voltage is transmitted from the first capacitor 11 to the second capacitor 14 through the first auxiliary branch circuit 15, and the second intermediate voltage is transmitted from the second capacitor 14 to the DC-DC circuit 16.

When the operation state of the load L is switched from the light load condition to a heavy load condition, the first capacitor 11 starts to discharge and the voltage of the first capacitor 11 starts to drop. Since the control loop of the PFC circuit 10 is operated at a slow speed, the voltage of the first capacitor 11 drops at a fast speed. In other words, the PFC circuit 10 is unable to provide sufficient power to the DC-DC circuit 16. For addressing this issue, the control method of the power converter 1 is specially designed. When the first intermediate voltage is lower than or equal to a first threshold voltage Vcth1 and the second intermediate voltage is lower than or equal to the first threshold voltage Vcth1, the control circuit 17 enables the second auxiliary branch circuit 13. When the second auxiliary branch circuit 13 is enabled, the first intermediate voltage is boosted by the second auxiliary branch circuit 13 to generate the second intermediate voltage on the second capacitor 14. Under this circumstance, the second intermediate voltage is adjusted to be within a predetermined range. Consequently, even if the operation state of the load L is switched from the light load condition to the heavy load condition, the magnitude of the second intermediate voltage is not largely decreased.

In an embodiment, the load in the light load condition is less than 30% of the rated power, and the load in the heavy load condition is more than 50% of the rated power. Alternatively, the load in the light load condition is less than 20%, 10% or 5% of the rated power, and the load in the heavy load condition is more than 70% or 90% of the rated power. In an extreme condition, the load in the heavy load condition is 200% of the rated power.

In an embodiment, the first auxiliary branch circuit 15 comprises a diode or a metal-oxide-semiconductor field-effect transistor (MOSFET). In case that the first auxiliary branch circuit 15 comprises a diode, the diode does not need to be controlled by the control circuit 17. When the second auxiliary branch circuit 13 is enabled to boost the first intermediate voltage, the second intermediate voltage from the second capacitor 14 is higher than the first intermediate voltage from the first capacitor 11 and the first auxiliary branch circuit 15 is disabled automatically. In case that the first auxiliary branch circuit 15 comprises the controllable switch, the on/off state of the controllable switch is controlled by the control circuit 17.

When the power converter 1 is in the normal working state, the first auxiliary branch circuit 15 is enabled to bypass the second auxiliary branch circuit 13. Under this circumstance, the difference between the second intermediate voltage and the first intermediate voltage is equal to the cross voltage of the first auxiliary branch circuit 15 (e.g., the cross voltage of the diode). So the first intermediate voltage is almost equal to the second intermediate voltage. When the first intermediate voltage is lower than or equal to a first threshold value Vcth1 and the second intermediate voltage is lower than or equal to the first threshold value Vcth1, the control circuit 17 enables the second auxiliary branch circuit 13. When the power converter 1 is in the normal working state, the input voltage required for powering the DC-DC circuit 16 is Vbn. In an embodiment, the magnitude of the first threshold value Vcth1 could be set to 85%×Vbn. In other embodiment, the magnitude of the first threshold value Vcth1 could be set to less than 85%×Vbn.

From the above descriptions, the power converter 1 is equipped with the first auxiliary branch circuit 15 and the second auxiliary branch circuit 13. The first auxiliary branch circuit 15 and the second auxiliary branch circuit 13 are connected with each other in parallel. When the operation state of the load L is switched from the light load condition to the heavy load condition and both of the first intermediate voltage and the second intermediate voltage are lower than or equal to the first threshold value Vcth1, the second auxiliary branch circuit 13 is enabled and the first auxiliary branch circuit 15 is disabled. So the magnitude of the second intermediate voltage from the second capacitor 14 could be maintained within a predetermined range. So a fluctuation of the input voltage received by the DC-DC circuit 16 is very small, the peak current and the voltage stress of the DC-DC circuit 16 are reduced. Further, the electronic components withstanding low voltage and low current can be used in the DC-DC circuit 16. Moreover, when the operations state of the load L is changed, the second intermediate voltage is not subjected to a large change. Consequently, the overall dynamic response speed of the power converter 1 is increased. Especially, since the magnitude of the second intermediate voltage is maintained within a predetermined range, the output voltage of the DC-DC circuit 16 can be maintained at a higher level. Under this circumstance, the resonant capacitor voltage and the resonant current of the DC-DC circuit 16 are largely decreased.

Further, in some embodiments, the control circuit 17 records a duration when the second auxiliary branch circuit 13 is enabled. If the second auxiliary branch circuit 13 has been enabled for a predetermined period $t_{max}$, the second auxiliary branch circuit 13 is disabled by the control circuit 17. In such way, the duration of enabling the second auxiliary branch circuit 13 is not too long, and the electronic components of the second auxiliary branch circuit 13 are not damaged. Generally, the operation state of the load L may be switched from the heavy load condition to the light load condition after the second auxiliary branch circuit 13 is enabled. Since the load is largely reduced, the second intermediate voltage of the second capacitor 14 may be largely increased. For achieving the overvoltage protection, a second threshold voltage Vcth2 is set in the control circuit 17. When the second intermediate voltage is higher than or equal to the second threshold voltage Vcth2, that is, the second intermediate voltage is close to the withstanding voltage (e.g., the overvoltage protection threshold) of the DC-DC circuit 16. Under this circumstance, the PFC circuit 10 and the auxiliary circuit 12 are disabled by the control unit 17. Under this circumstance, the voltage of the second capacitor 14 is provided to the DC-DC circuit 16. In an embodiment, the second threshold voltage Vcth2 is 110% (or more) of the rated input voltage of the DC-DC circuit 16.

In some embodiments, a third threshold voltage Vcth3 is set in the control circuit 17. When the first intermediate voltage on the first capacitor 11 or the second intermediate voltage on the second capacitor 14 is lower than or equal to the third threshold voltage Vcth3, that is, the first intermediate voltage or the second intermediate voltage is lower than the critical voltage (i.e., an under-voltage protection threshold) of the DC-DC circuit 16. Under this circumstance, the PFC circuit 10, the auxiliary circuit 12 and the DC-DC circuit 16 are disabled by the control circuit 17, so the power converter 1 is disabled. In an embodiment, the third threshold voltage Vcth3 is 70% (or less) of the rated input voltage of the DC-DC circuit 16.

As mentioned above, the third threshold voltage Vcth3 is smaller than the first threshold value Vcth1, and the first threshold value Vcth1 is smaller than the second threshold voltage Vcth2.

Figure 2:
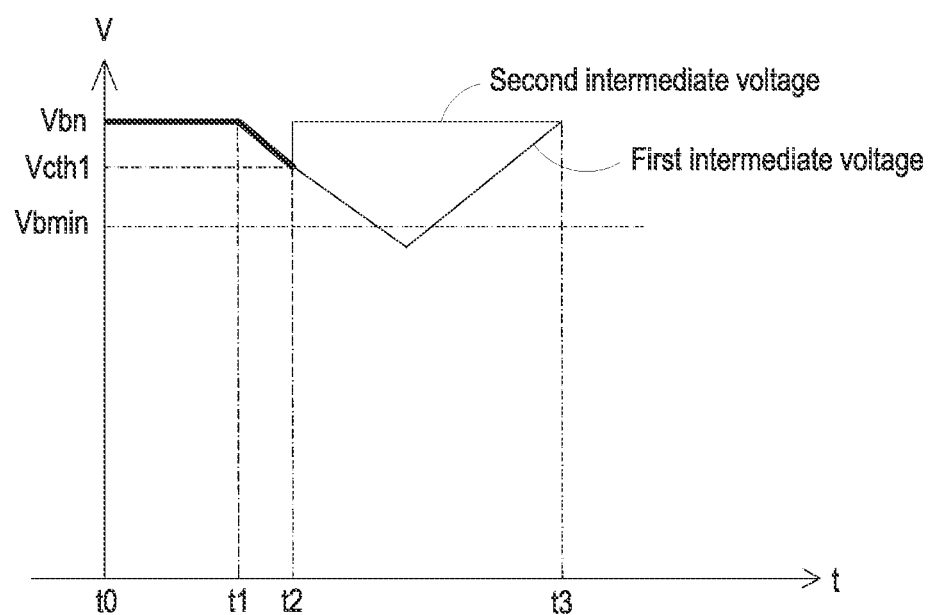
FIG. 2 shows waveforms of the first intermediate voltage and the second intermediate voltage of the power converter as shown in FIG. 1.

FIG. 2 shows waveforms of the first intermediate voltage and the second intermediate voltage of the power converter as shown in FIG. 1. During the duration between t0 and t1, the power converter 1 is in the normal working state. For example, the load L is in the light load condition. Meanwhile, the second auxiliary branch circuit 13 is disabled, and the first auxiliary branch circuit 15 is enabled. Under this circumstance, the difference between the second intermediate voltage and the first intermediate voltage is equal to the cross voltage of the first auxiliary branch circuit 15 (e.g., the cross voltage of the diode). Generally, the first intermediate voltage is almost equal to the second intermediate voltage. Moreover, the second intermediate voltage is the input voltage Vbn required for powering the DC-DC circuit 16 when the power converter 1 is in the normal working state. At the time point t1, the load L is switched from the light load condition to the heavy load condition. The first capacitor 11 and the second capacitor 14 start to discharge, and the first intermediate voltage and the second intermediate voltage start to decrease. At the time point t2, the first intermediate voltage on the first capacitor 11 is decreased to the first threshold value Vcth1 and the second intermediate voltage on the second capacitor 14 is decreased to the first threshold value Vcth1. Meanwhile, the second auxiliary branch circuit 13 is enabled by the control circuit 17. As the magnitude of the second intermediate voltage is increased to the input voltage Vbn required for powering the DC-DC circuit 16, the DC-DC circuit 16 can work normally. Since the control loop of the PFC circuit 10 is operated at a slow speed, the first intermediate voltage is slowly adjusted to the input voltage Vbn.

In some embodiments, the control circuit 17 records the duration when the second auxiliary branch circuit 13 is enabled (e.g., the duration from t1 to t2). If the second auxiliary branch circuit 13 has been enabled for a predetermined period $t_{max}$, the second auxiliary branch circuit 13 is disabled by the control circuit 17. In such way, the duration of enabling the second auxiliary branch circuit 13 is not too long.

As mentioned above, the power converter 1 comprises an auxiliary circuit 12. When the power converter 1 is in the normal working state, the first auxiliary branch circuit 15 is enabled to power the DC-DC circuit 16. When the operation state of the load L is switched from the light load condition to the heavy load condition, the first intermediate voltage is boosted by the second auxiliary branch circuit 13 and the second intermediate voltage is maintained within the predetermined range. So the capacitance of the second capacitor 14 may be lower than the capacitance of the first capacitor 11. Even if the first intermediate voltage is lower than the minimum input voltage Vbmin of the DC-DC circuit 16, the second intermediate voltage on the second capacitor 14 can guarantee the normal operation of the DC-DC circuit 16.

In this embodiment, the first threshold value Vcth1 is higher than the minimum input voltage Vbmin of the DC-DC circuit 16, and the first threshold value Vcth1 is lower than the input voltage Vbn required for powering the DC-DC circuit 16 in normal condition. Moreover, the second threshold voltage Vcth2 is higher than the input voltage Vbn required for powering the DC-DC circuit 16 in normal condition, and the third threshold voltage Vcth3 is lower than the minimum input voltage Vbmin of the DC-DC circuit 16.

Generally, the load L fluctuates. When the light load condition is switched to the heavy load condition or the heavy load condition is switched to the light load condition, the second capacitor 14 needs to be subjected to a charging operation or a discharging operation. Consequently, the lager ripple voltage and current are generated. For reducing the influence of the ripple voltage and current, the electrolytic capacitor with large capacitance can be used as the second capacitor 14. In some other embodiments, the second capacitor 14 comprises a plurality of electrolytic capacitors connected in parallel so as to meet the requirements of ripple current.

Figure 3:
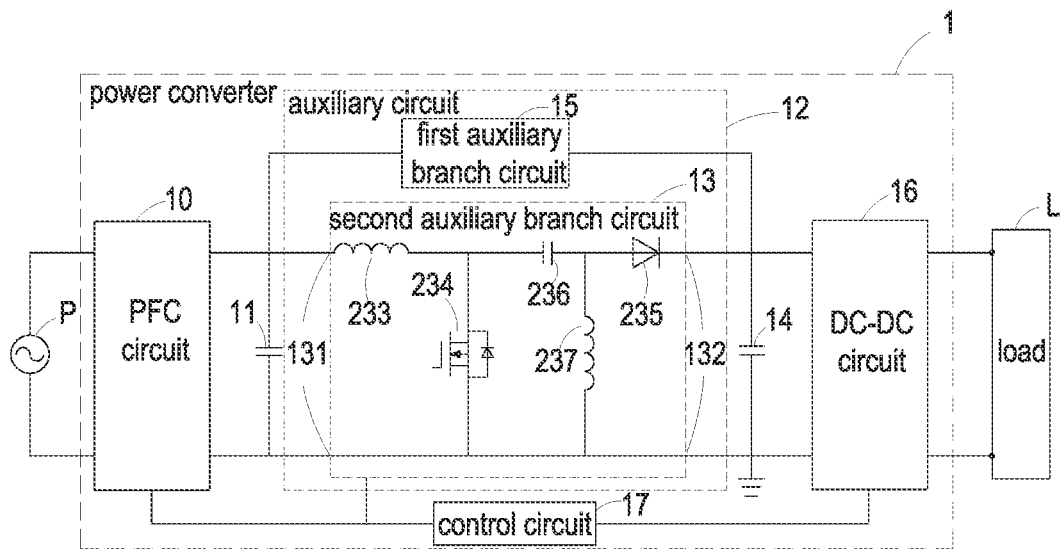
FIG. 3 is a schematic circuit diagram illustrating the power converter with a first exemplary second auxiliary branch circuit.

FIG. 3 is a schematic circuit diagram illustrating the power converter with a first exemplary second auxiliary branch circuit. As shown in FIG. 3, the second auxiliary branch circuit 13 comprises a first inductor 233, a second inductor 237, a switch 234, a third capacitor 236 and a diode 235. A first terminal of the first inductor 233 is electrically connected with a first terminal of the first capacitor 11. A second terminal of the first inductor 233 is electrically connected with a first terminal of the switch 234 and a first terminal of the third capacitor 236. A second terminal of the third capacitor 236 is electrically connected with an anode terminal of the diode 235 and a first terminal of the second inductor 237. A cathode terminal of the diode 235 is electrically connected with a first terminal of the second capacitor 14. A second terminal of the switch 234 and a second terminal of the second inductor 237 are connected to the ground terminal. The second terminal of the switch 234 is electrically connected with a second terminal of the first capacitor 11 and a second terminal of the second capacitor 14. The second terminal of the second inductor 237 is electrically connected with the second terminal of the first capacitor 11 and the second terminal of the second capacitor 14.

When the switch 234 is turned on, a first loop is defined by the first capacitor 11, the first inductor 233 and the switch 234 collaboratively and a second loop is defined by the third capacitor 236, the second inductor 237 and the switch 234 collaboratively. Meanwhile, the first inductor 233 and the second inductor 237 store energy. When the switch 234 is turned off, a third loop is defined by the first capacitor 11, the first inductor 233, the third capacitor 236, the diode 235 and the first capacitor 14 collaboratively, and a fourth loop is defined by the second inductor 237, the diode 235 and the first capacitor 14 collaboratively. Meanwhile, the first inductor 233 and the second inductor 237 release energy. In addition, the first inductor 233, the third capacitor 236 and the diode 235 of the second auxiliary branch circuit 13 are connected with each other in series and connected with the first auxiliary branch circuit 15 in parallel.

Figure 4:
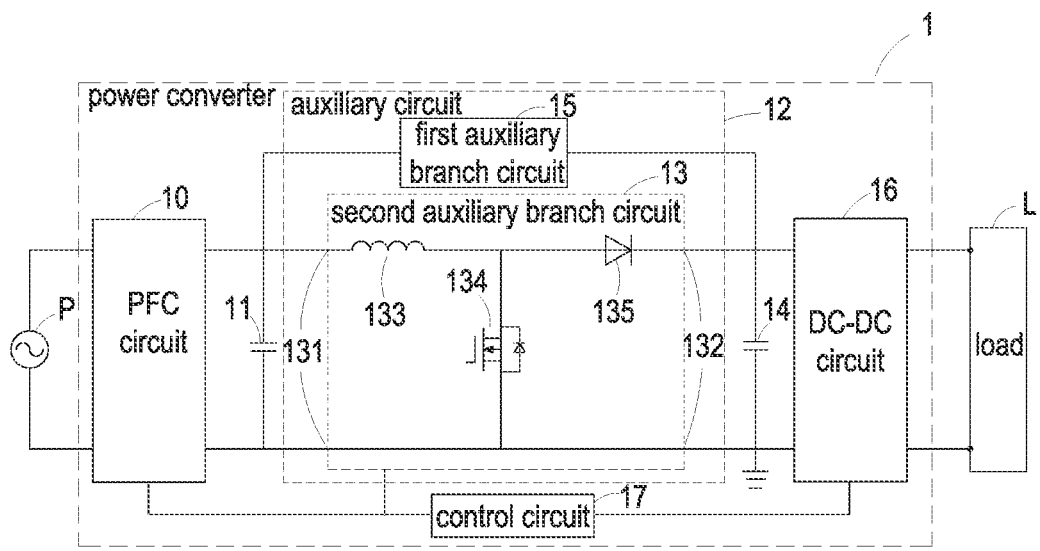
FIG. 4 is a schematic circuit diagram illustrating the power converter with a second exemplary second auxiliary branch circuit.

In another embodiment, the second auxiliary branch circuit 13 is a boost circuit. FIG. 4 is a schematic circuit diagram illustrating the power converter with a second exemplary second auxiliary branch circuit. As shown in FIG. 4, the second auxiliary branch circuit 13 comprises an inductor 133, a switch 134 and a diode 135. A first terminal of the inductor 133 is electrically connected with a first terminal of the first inductor 11. A second terminal of the inductor 133 is electrically connected with a first terminal of the switch 134 and an anode terminal of the diode 135. A cathode terminal of the diode 135 is electrically connected with a first terminal of the second capacitor 14. A second terminal of the switch 134 is connected to the ground terminal. The second terminal of the switch 134 is electrically connected with a second terminal of the first capacitor 11 and a second terminal of the second capacitor 14.

When the switch 134 is turned on, the inductor 133 stores energy. When the switch 134 is turned off, the first capacitor 11 and the inductor 133 transfer energy to the DC-DC circuit 16. In addition, the inductor 133 and the diode 135 of the second auxiliary branch circuit 13 are connected with each other in series and connected with the first auxiliary branch circuit 15 in parallel.

It should be noted that the boost circuitry of the second auxiliary branch circuit 13 may be varied according to the practical requirements, and the invention is not limited to specific circuit structure.

Figure 5:
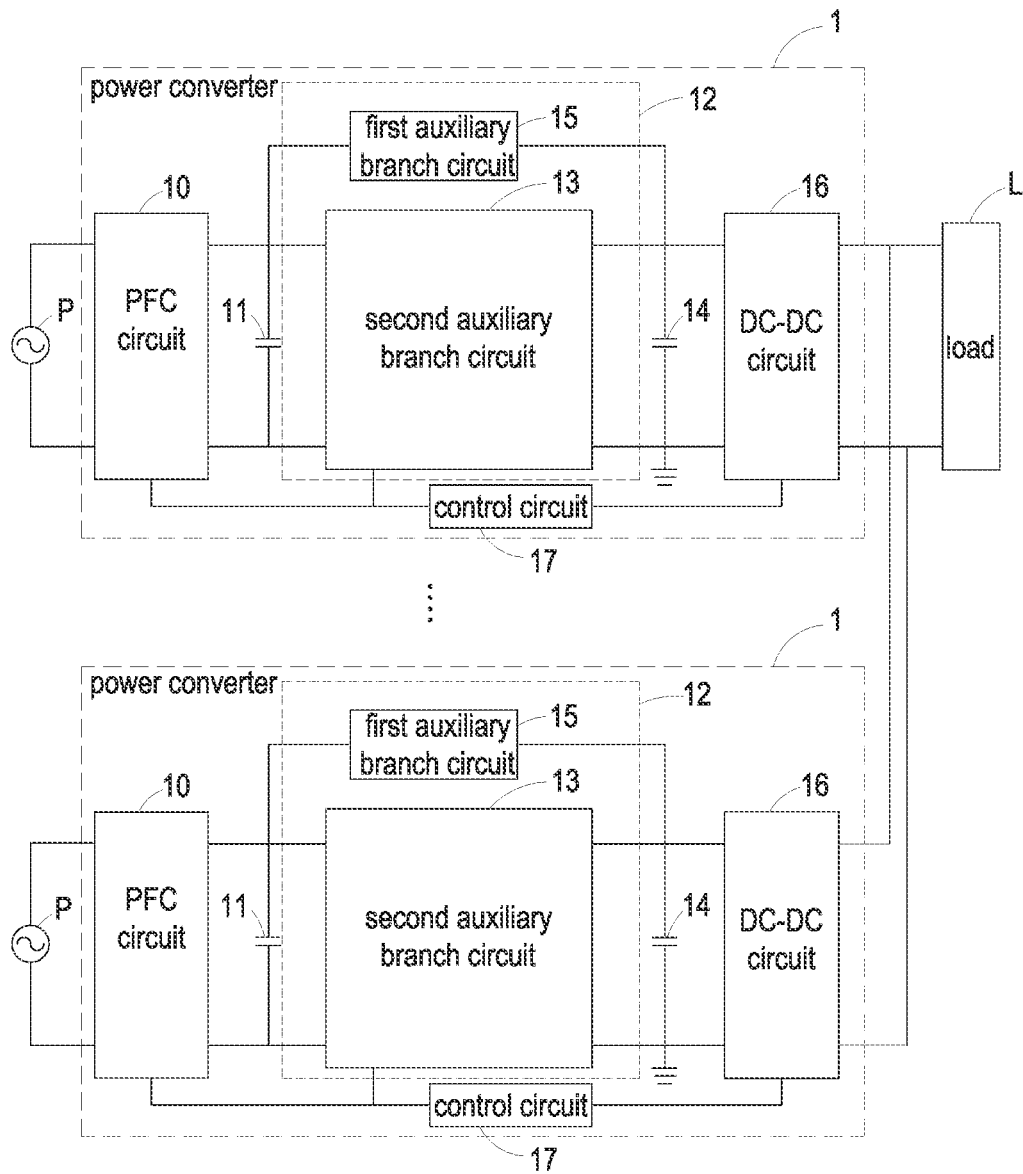
FIG. 5 is a schematic circuit diagram illustrating a power supply system according to an embodiment of the invention.

An aspect of the invention further provides a power supply system with a plurality of power converters 1 to provide more power to the load L. FIG. 5 is a schematic circuit diagram illustrating a power supply system according to an embodiment of the invention. The power supply system comprises a plurality of power converters 1. The circuitry structure of the power converter 1 is similar to that of FIG. 1, and is not redundantly described herein. The output terminals of the plurality of power converters 1 are connected with each other in parallel. And the plurality of power converters 1 is configured to power the at least one load L. When the operation state of the load L is switched between the light load condition and the heavy load condition, the control circuit 17 of each power converter 1 compares the first intermediate voltage and the second intermediate voltage with the first threshold voltage Vcth1 and the second threshold voltage Vcth2 respectively. According to the comparison result, the control circuit 17 selectively enables one of the first auxiliary branch circuit 15 and the second auxiliary branch circuit 13 of the auxiliary circuit 12 of the corresponding power converter 1. For example, when the operation state of the load L is switched from the light load condition to the heavy load condition, the second auxiliary branch circuit 13 of each power converter 1 is enabled to maintain the voltage of the second capacitor 14. Further, for reducing the ripple of the output voltage and increasing the current uniform precision of the plurality of power converters 1, the second capacitor 14 could choose electrolytic capacitors with large capacitance.

Figure 6:
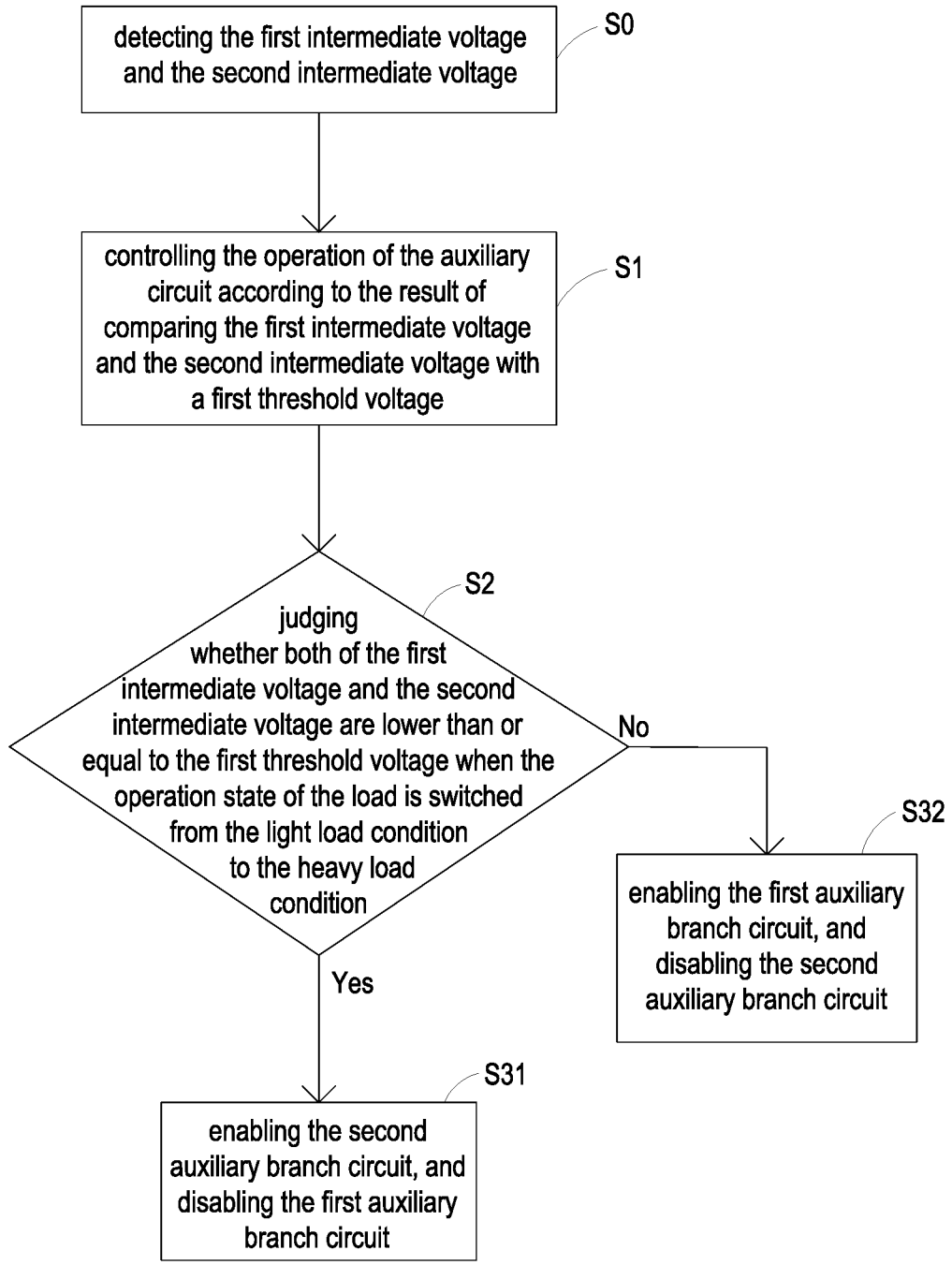
FIG. 6 is a flowchart illustrating a control method of the power converter according to a first embodiment of the invention.

FIG. 6 is a flowchart illustrating a control method of the power converter according to a first embodiment of the invention. Firstly, in a step S0, detecting the first intermediate voltage and the second intermediate voltage. Then, in a step S1, controlling the operation of the auxiliary circuit according to the result of comparing the first intermediate voltage and the second intermediate voltage with a first threshold voltage Vcth1. In the step S2, judging whether both of the first intermediate voltage and the second intermediate voltage are lower than or equal to the first threshold voltage Vcth1 when the operation state of the load L is switched from the light load condition to the heavy load condition. If the judging condition of the step S2 is satisfied (i.e. both of the first intermediate voltage and the second intermediate voltage are lower than or equal to the first threshold voltage Vcth1), the step S31 is performed. In the step S31, enabling the second auxiliary branch circuit 13, and disabling the first auxiliary branch circuit 15. After the second auxiliary branch circuit 13 is enabled, the control circuit 17 controls on/off state of the switch of the second auxiliary branch circuit 13. Consequently, the magnitude of the second intermediate voltage is maintained within a predetermined range. If the judging condition of the step S2 is not satisfied (i.e. both of the first intermediate voltage and the second intermediate voltage are higher than the first threshold voltage Vcth1), the step S32 is performed. In the step S32, enabling the first auxiliary branch circuit 15, and disabling the second auxiliary branch circuit 13.

Figure 7:
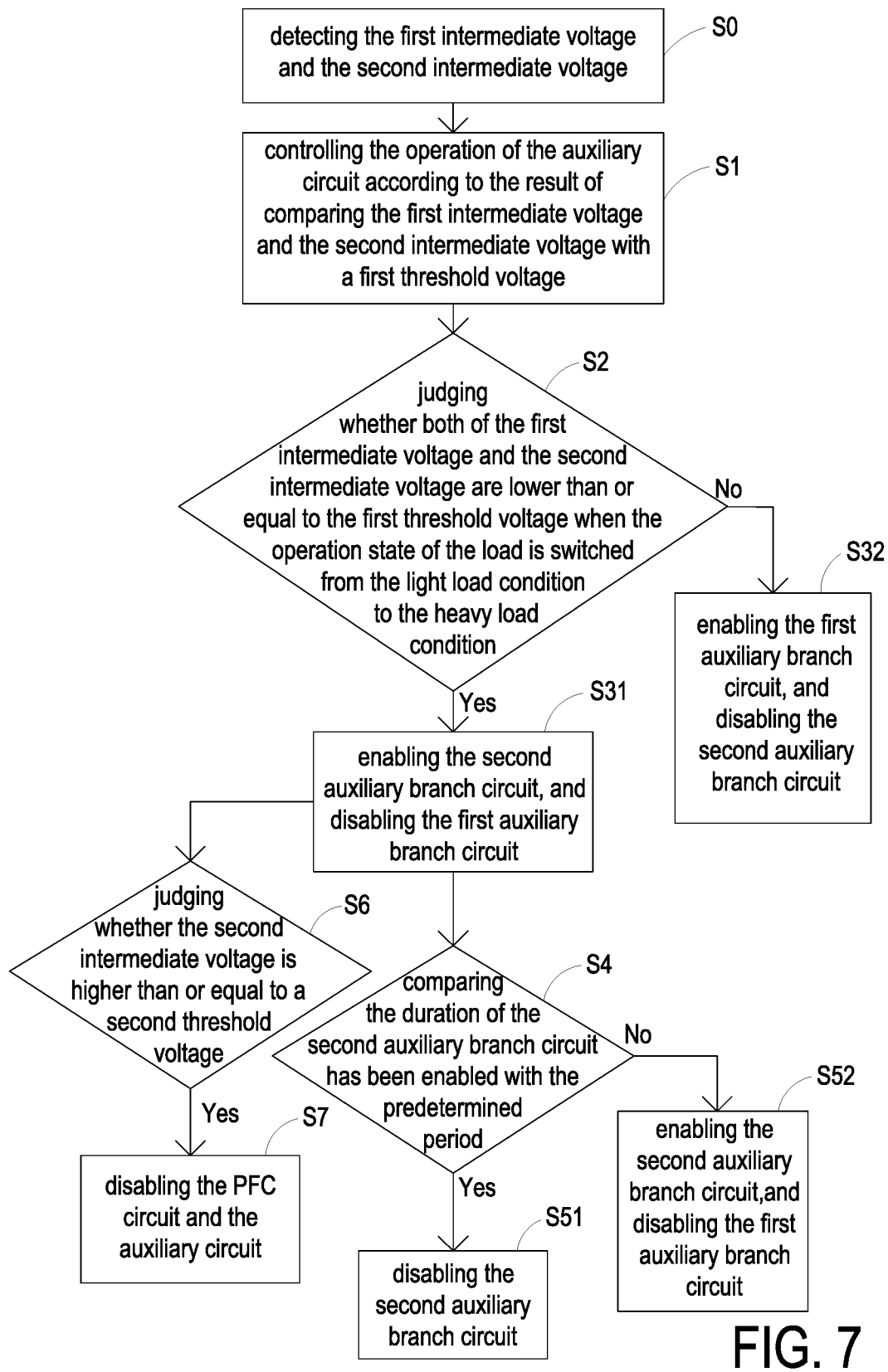
FIG. 7 is a flowchart illustrating a control method of the power converter according to a second embodiment of the invention.

FIG. 7 is a flowchart illustrating a control method of the power converter according to a second embodiment of the invention. The steps S0, S1, S2, S31 and S32 of this embodiment are identical to those of the flowchart of FIG. 6, and are not redundantly described herein. After the step S31, the control method of this embodiment further comprises the following steps. Firstly, in a step S4, comparing the duration of the second auxiliary branch circuit 13 has been enabled with the predetermined period $t_{max}$. If the judging condition of the step S4 is satisfied (i.e. the duration of second auxiliary branch circuit 13 has been enabled is greater than or equal to the predetermined period $t_{max}$), the step S51 is performed. In the step S51, disabling the second auxiliary branch circuit 13. Meanwhile, the first auxiliary branch circuit 15 is enabled to bypass the second auxiliary branch circuit 13. If the judging condition of the step S4 is not satisfied (i.e. the duration of the second auxiliary branch circuit 13 has been enabled is less than the predetermined period $t_{max}$), the step S52 is performed. In the step S52, enabling the second auxiliary branch circuit 13 continuously, and disabling the first auxiliary branch circuit 15.

Generally, the operation state of the load L may be switched from the heavy load condition to the light load condition after the second auxiliary branch circuit 13 is enabled. After the step S31, a step S6 is performed. In step S6, judging whether the second intermediate voltage is higher than or equal to a second threshold voltage Vcth2. If the judging condition of the step S6 is satisfied (i.e. the second intermediate voltage is higher than or equal to the second threshold voltage Vcth2), a step S7 is performed. In the step S7, disabling the PFC circuit 10 and the auxiliary circuit 12.

Figure 8:
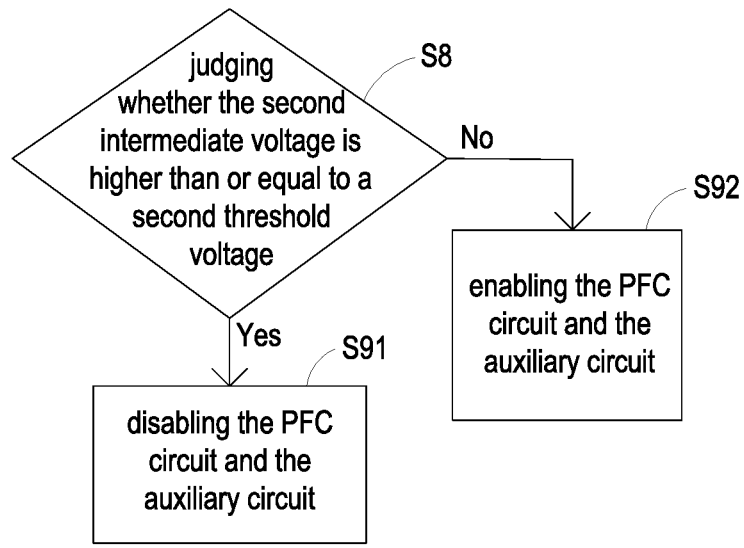
FIG. 8 is a flowchart illustrating a control method of the power converter according to a third embodiment of the invention.

FIG. 8 is a flowchart illustrating a control method of the power converter according to a third embodiment of the invention. Firstly, in a step S8, judging whether the second intermediate voltage is higher than or equal to a second threshold voltage Vcth2. If the judging condition of the step S8 is satisfied (i.e. the second intermediate voltage is higher than or equal to the second threshold voltage Vcth2), a step S91 is performed. In the step S91, disabling the PFC circuit 10 and the auxiliary circuit 12. If the judging condition of the step S8 is not satisfied (i.e. the second intermediate voltage is lower than the second threshold voltage Vcth2), a step S92 is performed. In the step S92, enabling the PFC circuit 10 and the auxiliary circuit 12 continuously. The step of judging whether the second intermediate voltage is higher than or equal to a second threshold voltage Vcth2 is continuously performed when the power converter 1 works. If the second intermediate voltage is higher than or equal to a second threshold voltage Vcth2, the PFC circuit 10 and the auxiliary circuit 12 are disabled.

Figure 9:
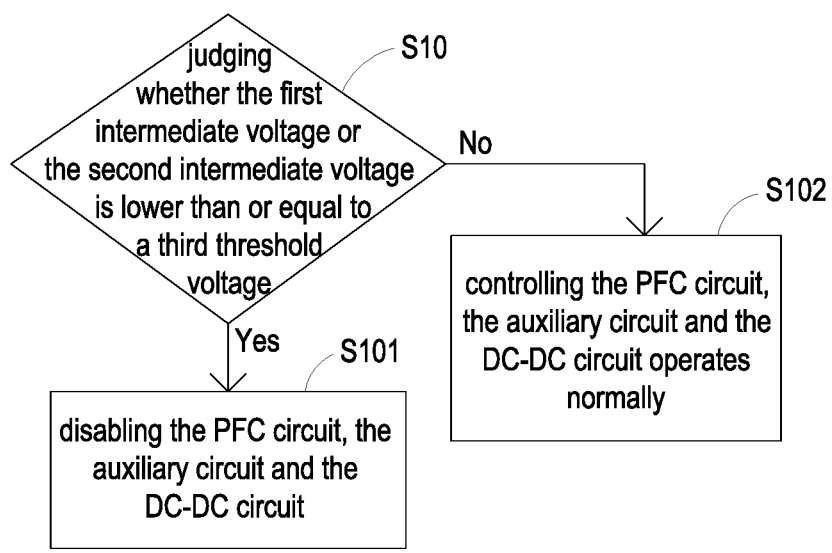
FIG. 9 is a flowchart illustrating a control method of the power converter according to a fourth embodiment of the invention.

FIG. 9 is a flowchart illustrating a control method of the power converter according to a fourth embodiment of the invention. Firstly, in a step S10, judging whether the first intermediate voltage or the second intermediate voltage is lower than or equal to a third threshold voltage Vcth3. If the judging condition of the step S10 is satisfied (i.e. the first intermediate voltage is lower than or equal to the third threshold voltage Vcth3, or the second intermediate voltage is lower than or equal to the third threshold voltage Vcth3), a step S101 is performed. In the step S101, disabling the PFC circuit 10, the auxiliary circuit 12 and the DC-DC circuit 16. That is, the power converter 1 is disabled. If the judging condition of the step S10 is not satisfied (i.e. both of the first intermediate voltage and the second intermediate voltage is higher than the third threshold voltage Vcth3), a step S102 is performed. In the step S102, controlling the PFC circuit 10, the auxiliary circuit 12 and the DC-DC circuit 16 operates normally.

From the above descriptions, the power converter is equipped with the first auxiliary branch circuit and the second auxiliary branch circuit. The first auxiliary branch circuit and the second auxiliary branch circuit are connected with each other in parallel. When the operation state of the load is switched from the light load condition to the heavy load condition and both of the first intermediate voltage and the second intermediate voltage are lower than or equal to the first threshold value, the second auxiliary branch circuit is enabled and the first auxiliary branch circuit is disabled. So the magnitude of the second intermediate voltage is maintained within a predetermined range. Further, the fluctuation of the input voltage received by the DC-DC circuit is very small, the peak current and the voltage stress of the DC-DC circuit are reduced. The electronic components withstanding low voltage and low current can be used in the DC-DC circuit, the power converter of the invention is cost-effective and has the enhanced power density. Moreover, the second intermediate voltage is not subjected to a large change when the operations state of the load is changed largely. So the overall dynamic response speed of the power converter is increased. Especially, since the magnitude of the second intermediate voltage is maintained within a predetermined range, the output voltage from the DC-DC circuit can be maintained at a higher level. Under this circumstance, the resonant capacitor voltage and the resonant current of the DC-DC circuit are largely decreased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power converter for converting an input voltage into an output voltage, and providing the output voltage to a large dynamic load, the power converter comprising:
   a PFC circuit for converting the input voltage into a first intermediate voltage;
   a first capacitor electrically connected with the PFC circuit;
   a second capacitor;
   an auxiliary circuit, wherein an input terminal of the auxiliary circuit is electrically connected with the first capacitor and the PFC circuit, and an output terminal of the auxiliary circuit is electrically connected with the second capacitor, the auxiliary circuit converts the first intermediate voltage into a second intermediate voltage on the second capacitor; wherein the auxiliary circuit comprises:
   a first auxiliary branch circuit; and
   a second auxiliary branch circuit connected with the first auxiliary branch circuit in parallel, wherein when the second auxiliary branch circuit is disabled, the first auxiliary branch circuit is enabled, and when the second auxiliary branch circuit is enabled, the first auxiliary branch circuit is disabled;
   a DC-DC circuit electrically connected with the second capacitor and the output terminal of the auxiliary circuit, and converting the second intermediate voltage into the output voltage; and
   a control circuit electrically connected with the PFC circuit, the auxiliary circuit and the DC-DC circuit, wherein while an operation state of the load is switched between a light load condition and a heavy load condition, one of the first auxiliary branch circuit and the second auxiliary branch circuit is enabled by the control circuit according to a result of comparing the first intermediate voltage with a first threshold voltage and a second threshold voltage and a result of comparing the second intermediate voltage with the first threshold voltage and the second threshold voltage.

2. The power converter according to claim 1, wherein if both of the first intermediate voltage and the second intermediate voltage are lower than or equal to the first threshold voltage, the second auxiliary branch circuit is enabled by the control circuit.

3. The power converter according to claim 2, wherein the control circuit records a duration when the second auxiliary branch circuit is enabled and compares the duration with a predetermined period, when the duration exceeds the predetermined period, the second auxiliary branch circuit is disabled by the control circuit.

4. The power converter according to claim 1, wherein if the second intermediate voltage is higher than or equal to the second threshold voltage when the second auxiliary branch circuit is enabled, the PFC circuit and the auxiliary circuit are disabled by the control circuit, wherein the second threshold voltage is higher than the first threshold voltage.

5. The power converter according to claim 1, wherein when the first intermediate voltage is lower than or equal to a third threshold voltage, or the second intermediate voltage is lower than or equal to the third threshold voltage, the PFC circuit, the auxiliary circuit and the DC-DC circuit are disabled by the control circuit, wherein the third threshold voltage is lower than the first threshold voltage.

6. The power converter according to claim 1, wherein the second capacitor is an electrolytic capacitor.

7. The power converter according to claim 1, wherein the second capacitor comprises a plurality of electrolytic capacitors connected in parallel.

8. The power converter according to claim 1, wherein the first auxiliary branch circuit comprises a MOSFET or a diode, and the second auxiliary branch circuit is a boost circuit.

9. The power converter according to claim 1, wherein the second auxiliary branch circuit comprises a first inductor, a second inductor, a switch, a third capacitor and a diode, wherein a first terminal of the first inductor is electrically connected with a first terminal of the first capacitor, a first terminal of the switch is electrically connected with a second terminal of the first inductor, a second terminal of the switch is electrically connected with a second terminal of the third capacitor, a first terminal of the third capacitor is electrically connected with the second terminal of the first inductor and the first terminal of the switch, the second terminal of the third capacitor is electrically connected with an anode terminal of the diode and a first terminal of the second inductor, a cathode terminal of the diode is electrically connected with a first terminal of the second capacitor, and a second terminal of the second inductor is electrically connected with a second terminal of the third capacitor.

10. The power converter according to claim 1, wherein the second auxiliary branch circuit comprises an inductor, a switch and a diode, wherein a first terminal of the inductor is electrically connected with a first terminal of the first inductor, a first terminal of the switch is electrically connected with a second terminal of the inductor, a second terminal of the switch is electrically connected with a second terminal of the first capacitor, an anode terminal of the diode is electrically connected with the second terminal of the inductor and the first terminal of the switch, and a cathode terminal of the diode is electrically connected with the second capacitor.

11. A power supply system comprising a plurality of power converters, output terminals of the plurality of power converters being connected with each other in parallel, each power converter converting an input voltage into an output voltage and providing the output voltage to a large dynamic load, each power converter comprising:
a PFC circuit for converting the input voltage into a first intermediate voltage;
a first capacitor electrically connected with the PFC circuit;
a second capacitor;
an auxiliary circuit, wherein an input terminal of the auxiliary circuit is electrically connected with the first capacitor and the PFC circuit, and an output terminal of the auxiliary circuit is electrically connected with the second capacitor, the auxiliary circuit converts the first intermediate voltage into a second intermediate voltage on the second capacitor; wherein the auxiliary circuit comprises:
a first auxiliary branch circuit; and
a second auxiliary branch circuit connected with the first auxiliary branch circuit in parallel, wherein when the second auxiliary branch circuit is disabled, the first auxiliary branch circuit is enabled, and when the second auxiliary branch circuit is enabled, the first auxiliary branch circuit is disabled;
a DC-DC circuit electrically connected with the second capacitor and the output terminal of the auxiliary circuit, and converting the second intermediate voltage into the output voltage; and
a control circuit electrically connected with the PFC circuit, the auxiliary circuit and the DC-DC circuit, wherein while an operation state of the load is switched between a light load condition and a heavy load condition, one of the first auxiliary branch circuit and the second auxiliary branch circuit is enabled by the control circuit according to a result of comparing the first intermediate voltage with a first threshold voltage and a second threshold voltage and a result of comparing the second intermediate voltage with the first threshold voltage and the second threshold voltage.

12. The power supply system according to claim 11, wherein if both of the first intermediate voltage and the second intermediate voltage are lower than or equal to the first threshold voltage, the second auxiliary branch circuit is enabled by the control circuit.

13. The power supply system according to claim 12, wherein the control circuit records a duration when the second auxiliary branch circuit is enabled and compares the duration with a predetermined period, when the duration exceeds the predetermined period, the second auxiliary branch circuit is disabled by the control circuit.

14. The power supply system according to claim 11, wherein if the second intermediate voltage is higher than or equal to the second threshold voltage when the second auxiliary branch circuit is enabled, the PFC circuit and the auxiliary circuit are disabled by the control circuit, wherein the second threshold voltage is higher than the first threshold voltage.

15. The power supply system according to claim 11, wherein if the first intermediate voltage is lower than or equal to a third threshold voltage, or the second intermediate voltage is lower than or equal to the third threshold voltage, the PFC circuit, the auxiliary circuit and the DC-DC circuit are disabled by the control circuit, wherein the third threshold voltage is lower than the first threshold voltage.

16. The power supply system according to claim 11, wherein the second capacitor comprises a plurality of electrolytic capacitors connected in parallel.

17. The power supply system according to claim 11, wherein the first auxiliary branch circuit comprises a MOSFET or a diode, and the second auxiliary branch circuit is a boost circuit.

18. A control method of a power converter for providing an output voltage to a large dynamic load, wherein the power converter comprises:
a PFC circuit for converting an input voltage into a first intermediate voltage;
a first capacitor electrically connected with the PFC circuit;
a second capacitor;
an auxiliary circuit, wherein an input terminal of the auxiliary circuit is electrically connected with the first capacitor and the PFC circuit, and an output terminal of the auxiliary circuit is electrically connected with the second capacitor, the auxiliary circuit converts the first intermediate voltage into a second intermediate voltage on the second capacitor; wherein the auxiliary circuit comprises:
a first auxiliary branch circuit; and
a second auxiliary branch circuit connected with the first auxiliary branch circuit in parallel, wherein when the second auxiliary branch circuit is disabled, the first auxiliary branch circuit is enabled, wherein when the second auxiliary branch circuit is enabled, the first auxiliary branch circuit is disabled;
a DC-DC circuit electrically connected with the second capacitor and the output terminal of the auxiliary circuit, and converting the second intermediate voltage into the output voltage;
wherein the control method comprises:
detecting the first intermediate voltage and the second intermediate voltage; and
controlling the operation of the auxiliary circuit according to the first intermediate voltage and the second intermediate voltage, wherein while an operation state of the load is switched between a light load condition and a heavy load condition, the operation of the auxiliary circuit is controlled according to a result of comparing the first intermediate voltage with a first threshold voltage and a second threshold voltage and a result of comparing the second intermediate voltage with the first threshold voltage and the second threshold voltage.

19. The control method according to claim 18, further comprising:
comparing the first intermediate voltage and the second intermediate voltage with the first threshold voltage, wherein if both of the first intermediate voltage and the second intermediate voltage are lower than or equal to the first threshold voltage, the second auxiliary branch circuit is enabled.

20. The control method according to claim 19, further comprising:

recording a duration when the second auxiliary branch circuit is enabled and comparing the duration with a predetermined period, when the duration exceeds the predetermined period, the second auxiliary branch circuit is disabled.

21. The control method according to claim 18, further comprising:

comparing the second intermediate voltage with the second threshold voltage when the second auxiliary branch circuit is enabled, wherein if the second intermediate voltage is higher than or equal to the second threshold voltage, the PFC circuit and the auxiliary circuit are disabled, wherein the second threshold voltage is higher than the first threshold voltage.

22. The control method according to claim 18, further comprising:

comparing the first intermediate voltage and the second intermediate voltage with the third threshold voltage, wherein if the first intermediate voltage is lower than or equal to the third threshold voltage or the second intermediate voltage is lower than or equal to the third threshold voltage, the PFC circuit, the auxiliary circuit and the DC-DC circuit are disabled, wherein the third threshold voltage is lower than the first threshold voltage.

* * * * *